United States Patent
Carragher

(10) Patent No.: US 12,312,904 B2
(45) Date of Patent: May 27, 2025

(54) DOWN-HOLE CHEMICAL HEATER AND METHODS OF OPERATING SUCH

(71) Applicant: BiSN Tec Ltd., Warrington (GB)

(72) Inventor: Paul Carragher, Lymm (GB)

(73) Assignee: BiSN Tec Ltd., Warrington (GB)

( * ) Notice: Subject to any disclaimer, the term of this patent is extended or adjusted under 35 U.S.C. 154(b) by 0 days.

(21) Appl. No.: 18/224,521

(22) Filed: Jul. 20, 2023

(65) Prior Publication Data

US 2023/0358113 A1 Nov. 9, 2023

Related U.S. Application Data

(63) Continuation of application No. 16/304,262, filed as application No. PCT/GB2017/051445 on May 24, 2017, now Pat. No. 11,753,897.

(30) Foreign Application Priority Data

May 24, 2016 (GB) .................................. 1609137
Aug. 19, 2016 (GB) .................................. 1614227

(51) Int. Cl.
*E21B 33/13* (2006.01)
*E21B 33/134* (2006.01)
*E21B 36/00* (2006.01)

(52) U.S. Cl.
CPC ............ *E21B 33/13* (2013.01); *E21B 33/134* (2013.01); *E21B 36/00* (2013.01); *E21B 36/008* (2013.01)

(58) Field of Classification Search
CPC ......... E21B 36/00; E21B 36/008; E21B 33/13
See application file for complete search history.

(56) References Cited

U.S. PATENT DOCUMENTS

| | | | | |
|---|---|---|---|---|
| 6,925,937 | B2* | 8/2005 | Robertson | E21B 29/02 |
| | | | | 102/202 |
| 8,151,895 | B1* | 4/2012 | Kunz | E21B 29/10 |
| | | | | 166/387 |
| 2007/0199691 | A1* | 8/2007 | Heller | E21B 33/126 |
| | | | | 166/162 |
| 2007/0199693 | A1* | 8/2007 | Kunz | E21B 33/128 |
| | | | | 166/179 |
| 2011/0174504 | A1* | 7/2011 | Wright | E21B 47/06 |
| | | | | 166/386 |
| 2015/0211322 | A1* | 7/2015 | Lowry | E21B 36/008 |
| | | | | 166/57 |
| 2020/0362662 | A1* | 11/2020 | Zhang | C09K 8/46 |

* cited by examiner

*Primary Examiner* — David Carroll

(57) ABSTRACT

The present disclosure provides a chemical heater for use in down-hole operations together with methods for operating such in oil/gas wells. The chemical heater comprises a heater body housing a chemical reaction heat source material. The heater body has a leading end and that, in use, is deployed down-hole first. The heater is provided with ignition means, located in a heating zone proximal to the leading end of the heater body, for triggering a chemical reaction in the chemical reaction het source material located in the heating zone. The heater is further provided with an actuator housed within the heater body and configured to urge the chemical reaction heat source material towards the heating zone so as to generate a focused heating pattern.

13 Claims, 8 Drawing Sheets

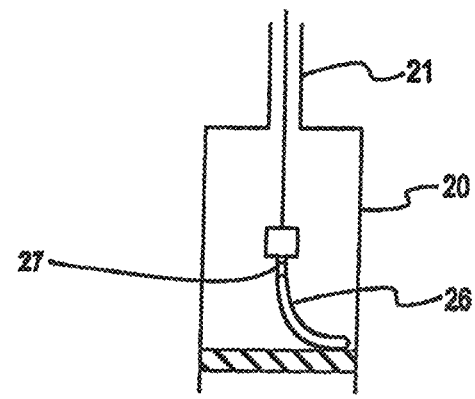
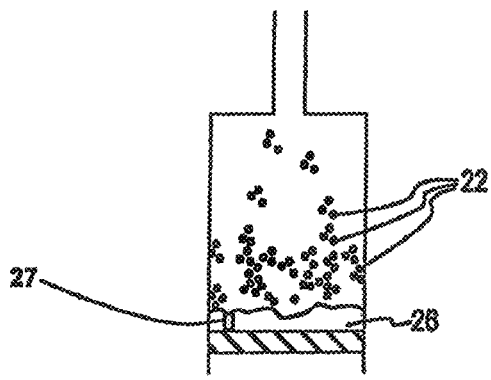
*Fig. 8*
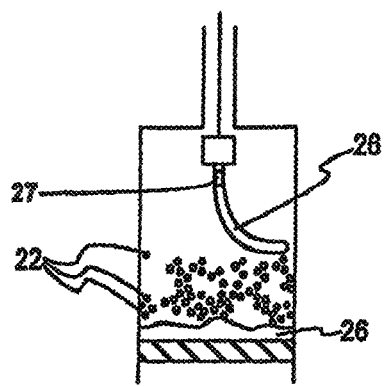

DOWN-HOLE CHEMICAL HEATER AND METHODS OF OPERATING SUCH

CROSS-REFERENCE TO RELATED APPLICATION

This application is a continuation of U.S. patent application Ser. No. 16/304,262 filed Nov. 23, 2018, which is hereby incorporated by reference in its entirety herein.

BACKGROUND OF THE INVENTION

The present invention relates to the operations carried out underground down holes and other underground conduits such as wells, and in particular oil and gas wells. More particularly the present invention relates to chemical heat sources for use in down-hole applications, such as the plugging or sealing of wells.

When a well, such as an oil or gas well, is at the end of its useful life it is usually abandoned. From time to time the operation of such wells can also be suspended for reasons such as low oil prices, "workovers" and other unexpected events that require the well to be temporary suspended (i.e. approaching storms or hurricanes). However before a well can be abandoned/suspended the well must be "plugged" to ensure that potentially hazardous materials, such as hydrocarbons, cannot escape the well.

In the past various methods have been employed to plug abandoned wells. One such known method involves pouring cement or resin into a well so as to fill a length of the well. However the use of cement/resin has proven to be unreliable and vulnerable to leaking. This can lead to previously abandoned wells being re-plugged zo at considerable extra expense.

In view of the limitations of using cement/resin to plug wells an alternative approach was developed which uses a eutectic alloy, such as bismuth-containing alloy, to form a seal within the well. This approach, which is described in detail in CA 2592556 and U.S. Pat. No. 6,923,263, utilises the fact that such alloys contract upon melting and expand again when they re-solidify. Essentially the alloy is deployed into a well; heated until it melts and "slumps"; and then allowed to cool whereby the alloy expands to form a tight seal with the walls of the well.

The use of eutectic alloys, such as bismuth-containing alloys, to plug wells or repair existing plugs in wells is described in: U.S. Pat. Nos. 7,290,609; 7,152,657; US 2006/0144591; U.S. Pat. Nos. 6,828,531; 6,664,522; 6,474,414; and US 2005/0109511.

International PCT application WO2011/151271 describes a number of improvements relating to methods and apparatus for use in well abandonment.

The heating of eutectic alloy (e.g. bismuth) plugs can be achieved by electrical and chemical means. International PCT application WO 2014/096857 describes chemical reaction heat sources for use in heaters for down-hole applications, such as the heating of eutectic alloy plugs. The chemical reaction heat sources described in this earlier document employ a fuel composition that combines thermite with a damping agent that tempers the speed and heat with which the thermite burns.

International patent application WO 2015/116261 describes the use of thermite to seal underground wells, such as oil or gas wells. The document describes the deployment of a quantity of thermite within a well and the subsequent ignition of the thermite from the base thereof.

A weight is loaded above the thermite such that the thermite is urged, under the force of gravity, towards the ignition region so that a continuously heated region is created within the well.

SUMMARY OF THE INVENTION

The present invention seeks to provide a number of improvements to the heater systems of the prior art.

In a first aspect of the present invention there is provided a chemical heater for use in down-hole operations, said heater comprising: a heater body housing a chemical reaction heat source material, wherein the heater body has a leading end that, in use, is deployed down-hole first; ignition means, located in a heating zone proximal to the leading end of the heater body, for triggering a chemical reaction in the chemical reaction heat source material located in the heating zone; and an actuator housed within the heater body and configured to urge the chemical reaction heat source material towards the heating zone.

By triggering a heat producing chemical reaction in the heating zone at the leading end of the heater, and then actuating the chemical reaction heat source material within the heater body so as to supply the heating region with more reactant material to keep the chemical reaction going, the heater of the present invention achieves a controlled and focused heating pattern which can be employed, for instance, to melt and thereby form or remove a eutectic/bismuth-based alloy well plug.

Although the disclosure primarily refers to eutectic and bismuth based alloys, it is envisaged that other alloys might suitable be employed in certain conditions. In particular, a group of alloys referred to as low melt alloys' or low melting point alloys' (LMPA) in the technical field of die casting are considered suitable. The alloys in this group are defined as having a melting point of 385° C. or below. In view of this, the present disclosure should be read as contemplating the use of not only eutectic/bismuth based alloys, but also LMPAs in the described tools and methods.

The chemical heater of the present invention is provided as a self-contained unit that can be readily deployed within a gas/oil well to deliver heat required for a particular down-hole operation.

Providing the chemical reaction heat source material (e.g. thermite), the ignitor and the actuator within the heater body ensures that the key components of the heater are accurately and effectively deployed to a target region down-hole.

The self-contained nature of the heater of the present invention also means that the chemical heaters can be prefabricated off-site to exact specifications rather than in the field. This is a more practical solution than constructing the heater on site, which may be in an adverse environment (e.g. at sea on an oil-rig).

It is envisaged that by controlling the formation of the heating zone in this way it is possible to greatly reduce the diameter of the heater body without compromising on the heating capabilities of the heater. That is to say, by using an actuator to restock the heating zone with unreacted heat source material from a part of the heater body outside the heating zone it is possible to achieve a hotter/more sustained heat output than would otherwise be achieved if the chemical reaction of the heat source material were simply allowed to progress up the heater body.

This ability to reduce the overall diameter of the heater without compromising the heating capabilities of the heater is considered highly beneficial when deploying the heater within holes of reduced or restricted (e.g. due to inner well obstructions) diameter.

Preferably the chemical reaction heat source material may comprise thermite or a thermite based composition. It is envisioned that the thermite might be provided in the form of a powder, one or more solid blocks or fragmented solid block (hereinafter referred to as 'crumble'). It is also envisaged that the thermite might be combined with additional materials (e.g. damping agent) to adjust its melt characteristics.

Preferably the actuator may comprise a piston that is resiliently biased towards the leading end of the heater body. In this way the unreacted chemical heat source material housed outside of the heating zone of the heater body is pushed towards the heating zone as the chemical reaction progresses thereby ensuring the region of the chemical reaction, and thus the heating zone, remains substantially static within an area proximal to the leading end of the heater body. That is to say the heating zone does not migrate up the heater body as it consumes the material.

Alternatively the actuator comprises a piston that, in use, is mechanically, hydraulically or pneumatically driven towards the leading end of the heater body.

The key benefit of employing an active actuator rather than simply relying upon gravity to direct unreacted material towards the heating zone is that the heater can still operate in holes with substantially horizontal orientations (i.e. where the force of gravity is applied in a direction that essentially perpendicular to that required).

Preferably the heating zone of the heater body may be configured to have a greater heat resistance than the rest of the heater body. In this way the heater body will retain its structural integrity even when subjected to the high temperatures created within the focused heating zone.

Further preferably the heating zone of the heater body may comprise a heat resistant base located at the leading end thereof and/or a heat resistant sleeve located adjacent to the leading end of the heater body.

Preferably the inner walls of the heater body may be provided with a refractory lining. Examples of which include fibre glass, Kevlar® and a coating of a ceramic material, such as zirconium oxide ($ZrO_2$), aluminium oxide or magnesium oxide.

The zirconium oxide may also be partially stabilized using dopants such as yttrium oxide, magnesium oxide, calcium oxide, and cerium (III) oxide. zirconium oxide may also be referred to as zirconium dioxide and zirconia.

One benefit of having a lining on the inner walls of the heater body is that it prevents the chemical heat source material (e.g. thermite) from sticking to the inside surface of the heater body. This is a problem in heaters where it is desirable for the molten heat source to flow within the heater body. Essentially the lining serves to reduce the wettability of the inside surface of the heater body so that the molten hear source material does not stick to the heater body.

Preventing the molten heat source material from sticking to the heater body stops the heat source material from concentrating heat in a particular spot and melting through the wall of the heater body at that point.

Another benefit of a lining is that it affords some heat shielding to walls of the heater body, which in turn enables the heater body walls to be made thinner without risk of them being burned through.

Preferably the heater body may be provided with at least one weakened region that is configured to melt before the heat resistant region of the heater, and preferably before the rest of the heater body. In other words the heating body is provided with one or more points that are less capable than at least the heating zone, and possibly the rest of the heating body, of resisting the high temperatures created by the heater.

Preferably said weakened region(s) may be configured to create a discharge point in the heater body through which molten chemical reaction heat source material can escape the heating zone of the heater. The benefit of this arrangement is at least two-fold.

Firstly, it is envisaged that allowing the reacting material, which is fluid in nature, to escape from heater body makes room for the unreacted chemical reaction heat source material entering the heating zone under force of the actuator to replace the discharged material. This, in turn, allows the size of the heating zone to be better controlled, thereby improving the focus of the heat pattern. That is to say, the chemical reaction does not propagate up the heater body away from the leading end thereof.

Secondly, it is appreciated that by allowing the molten material to escape the heater body and enter the surrounding medium, which might be a eutectic/bismuth-based alloy, a well casing or even the surrounding formation, the heat generated by the heater can be distributed radially from the heater body. Distribution of the heat in a radial direction is preferable to the distribution of heat along the length of the heater body because it facilitates the formation of a more complete plug across the entire cross-section of the well hole and the underground formation within which it is formed.

It is appreciated that the above identified benefits of the providing one or more weakened regions in the heater body can be achieved without the need for an actuator in the heater. In this regard, it is envisaged that, advantageously, tubular heater bodies more generally can be provided with weakened regions that can fail at increased temperatures, i.e. by melting, and/or at increased pressures, i.e. by the actuation of pressure actuated devices.

In particular, said weakened regions can be triggered to fail and, in so doing, reveal one or more conduits that allow the interior of the heater body (where the chemical reaction heat source material is housed) to communicate with the exterior of the heater body.

The failure of the weakened regions may therefore beneficially occur in response to the heat generated by the chemical reaction heat source and/or in response to the environmental pressures incident on the heater body.

In view of this, in a related aspect of the present invention, there is provided a chemical heater for use in down-hole operations, said heater comprising: a tubular heater body with an internal cavity housing a chemical reaction heat source material; and wherein the tubular heater body has at least one weakened region that is configured to fail before the rest of the heater body so as to reveal a conduit that connects the internal cavity of the tubular heater body with the exterior of the tubular heater body.

Preferably said at least one weakened region may comprise a plugged conduit formed in the heater body, wherein the conduit is plugged by a material with a lower melting point than the rest of the tubular heater body.

Alternatively said at least one weakened region may comprise a region of reduced thickness in the tubular heater body. Further preferably the region of reduced thickness may be formed by drilling part way into the wall of the tubular heater body.

In both instances, the weakened region is primed to fail before the rest of the tubular heater body in response to temperature increases, thereby revealing a conduit that connects the inside and outside of the tubular heater body.

In a further alternative, said at least one weakened region may comprise a plugged conduit formed in the heater body, wherein the conduit is plugged by a pressure actuated device that is configured to fail at a predetermined pressure. Further preferably, the pressure actuated device comprises a burst disc.

In this variant it is the pressure differential between the internal cavity of the tubular heater body and the exterior down-hole environment that triggers the weakened region to fail and reveal a conduit that connects the inside and outside of the tubular heater body.

As detailed above, the provision of weakened regions can be used to provide a focused outlet for the molten chemical reaction heat source (e.g. thermite) to escape the heater body. The benefits of this are discussed above and can be expressed in both the actuated heaters of the present invention and also more generally in non-actuated heaters.

It is envisaged that, in order to obtain the benefits of the focused thermite outlet, the weakened regions are preferably located in the proximity of the leading end of the tubular heater body (i.e. the heater end that is deployed down-hole first). However this positioning of the weakened regions is not essential.

The inventors have now discovered that by locating the weakened regions at other points along the length of the tubular heater body it is possible to provide other technical benefits to the tubular heater body.

In particular, it has been discovered that providing conduits in the tubular heater body that can be revealed at predetermined temperatures or pressures also facilitates the passage of fluids from the surrounding down-hole environment into the internal cavity of the heater body during the operation of the heater.

During the operation of the tubular heater in a down-hole environment, a pressure differential between the interior of the heater body and exterior environment can be created; as a result of which external forces can work to deform or even crush the tubular heater body.

It has been discovered that although the effects of these external forces acting upon the tubular heater body is always present in the down-hole environment, their effects are enhanced during the operation of the heater (i.e. when heat is being created).

One reason for this is that, as the heater is heated by the chemical reaction heat source housed within it, the metal of the tubular heater body (e.g. steel) softens. This softening reduces the heater body's ability to retain its shape under the external forces imparted on it, which can lead to structural deformation and even failure of the heater body.

Another reason is that, as the chemical reaction heat source is consumed by the heating reaction, a space is created within the heater body. It will be appreciated that as a space is created within the interior of the heater body, its walls have less structural support to push back against the external forces acting on the heater body. Once again this can allow the external forces to deform or even crush the tubular heater body Therefore, by providing weakened regions which can be triggered, either in response to temperature increases or pressure increases, to reveal one or more conduits the heater of this aspect of the present invention allows fluid from the surrounding down-hole environment to flood into the internal space of the heater body.

As the fluid floods into the heater body it can help to equalise the internal pressure of the heater with the surrounding down-hole environment, and in so doing prevent the heater body being deformed or even crushed by the force of the external pressures exerted on the heater body. It is envisaged that the above described features of the weakened regions can be used alone or in combination with the actuated heater concept disclosed herein.

It is appreciated that the following preferable features can be adopted in both the actuated heaters of the present invention and the non-actuated heaters with weakened regions of the present invention.

Preferably a eutectic/bismuth based alloy is received on the heater body such that it can be deployed downhole with the heater. Other alloys, such as 'low melt alloys' or 'low melting point alloys', may also be received on the heater body.

It is appreciated that applying the alloy directly to the heater body is beneficial because the alloy effectively 'sucks' the heat away from the heater body as it is generated, which prevents the heater body itself from overheating. By avoiding overheating of the heater body it is possible to also avoid the structural problems (e.g. warping) that may occur when the material of the heater body approaches its melting point. It is envisioned that this benefit is also achieved when the heater body is surrounded by and placed in direct contact with alloy shot (see below).

The following features are considered applicable to the chemical heaters of the various aspects of the present invention.

The heater body has a trailing end, located at the opposite end of the heater body to the leading end, which preferably is provided with deployment tool engagement means. In this way the heater can readily be deployed down-hole leading end first.

Preferably the interior of the heater body may be provided with one or more baffles to slow the movement of the chemical reaction heat source towards the heating zone of the heater body. This arrangement is considered particularly applicable when the chemical heat source material is provided in the form of a powder or a fragmented solid block (i.e. crumble).

Further preferably said baffles may be formed from a heat resistant material and are located within the heating zone of the heater body. The baffles also help to direct the molten thermite in a desired direction.

The present invention also provides eutectic/bismuth alloy well plugging/sealing tools that comprise a chemical heater of the present invention, either in the form of the actuated heater or the non-actuated heater with at least one weakened region. As detailed above, the tools may also employ other alloys, such as LMPAs, to plug/seal a well.

In another aspect of the present invention there is provided a method of operating a chemical heater down-hole, said method comprising: deploying a heater according to the first aspect of the present invention down a hole leading end first until the heater is located at a target site within the hole; activating the ignition means to trigger a reaction in the chemical heat source located in a heating zone of proximal to the leading end of the heater body; actuating the actuator to urge unreacted chemical reaction heat source material within the heater body towards the heating zone.

Preferably the method further comprises locating a eutectic/bismuth-based alloy adjacent to the heating zone of the heater body before activating the ignition means. In this way the method can be used to deploy or remove a eutectic/bismuth-based alloy plug (e.g. eutectic alloy plug) within a down-hole environment such as a gas/oil well.

Further preferably the step of locating the eutectic/bismuth-based alloy adjacent to the heating zone may involve deploying the heater down a hole until the heater is positioned relative to pre-deployed alloy within the hole.

In this way the heater of the present invention can be used to activate prepositioned devices such as thermally deformable annular packers (TDAPs) such as those described in International PCT Application No. PCT/GB2015/052347.

Alternatively the step of locating the eutectic/bismuth-based alloy adjacent to the heating zone may involve mounting the alloy on the outside of the heater and deploying both the heater and the alloy down a hole at the same time.

In this way the heater can be used to deliver and deploy a eutectic/bismuth-based alloy plug within a down-hole environment, such as a gas/oil well for example.

By way of a further alternative the step of locating the eutectic/bismuth-based alloy adjacent to the heating zone may involve deploying the alloy within a well after the heater has been deployed.

In this arrangement the heater is located in position within the well hole first and then the eutectic/bismuth-based alloy can be provided later in a separate deployment. It is envisaged that eutectic/bismuth-based alloy shot (e.g. a plurality of small roughly spherical pieces of alloy or alternatively a plurality of small chips of alloy) is particularly suitable for this approach because the relatively small size of the shot enables the alloy to fill in around the body of the heater.

In all of the above arrangements the heat provided by the heating zone is preferably directed towards the eutectic/bismuth-based alloy to melt it. It will be appreciated that melting the alloy is key to the formation of a gas-tight seal within the well.

Preferably the method of the present invention may involve deploying the heater within a hole that a substantially horizontal orientation. It will be appreciate that the heater of the present invention is particularly suitable for deployment within holes that have high inclines or orientations that are substantially horizontal in nature because of the enclosed nature of the heater body and the provision of the actuator within the heater body.

Advantageous, in the method of the present invention the heater may be at least partially retrieved away from the alloy whilst the heating zone of the heater is still generating heat. Withdrawing the heater while it is still generating heat means that the alloy is still molten and fluid, which in turn enables the alloy to flow into the space vacated by the withdrawing heater.

In this way the alloy forms a complete seal across the entire cross-section of the well hole. In contrast, if withdrawal of the heater is delayed until after the surrounding alloy had been allowed to cool and solidify, the removal of the heater would leave behind a void within the alloy plug, which would impact on the quality of the seal formed.

It is envisaged that although the withdrawal of the heater whilst it is still hot is applicable to the method of the present invention, this approach may also usefully be employed with more typical heater arrangements. The present invention therefore provides for the partial withdrawal of any type of down-hole heater (e.g. chemical or electrical) from the melted alloy whilst the heater is still generating heat.

In view of this a further aspect of the present invention provides a method of forming a eutectic/bismuth-based alloy plug within a gas/oil well, said method comprising: providing eutectic/bismuth-based alloy within an oil/gas well; deploying a heater to the location of the alloy; operating the heater to melt the alloy; removing the heater from the alloy whilst the heater is still hot such that the alloy have yet to cool and solidify into a plug within the well.

Preferably the eutectic/bismuth-based alloy is provided down the hole in the form of alloy shot.

Another aspect of the present invention provides a flexible chemical heater, said heater comprising: a quantity of a chemical reaction heat source held within a flexible elongate surround or sock; ignition means to initiate the chemical reaction.

It is envisioned that employing a flexible heater rather than a rigid tubular heater enables heat to be delivered to locations within well that have highly restricted access.

Preferably the chemical reaction heat source material may be provided in a powder form. It is envisaged that this would help make the heater even more flexible. However, it is appreciated that solid blocks of the chemical reaction heat source material may also be used.

Preferably the flexible elongate surround or sock may be formed from a synthetic fibre of a high tensile strength (e.g. Kevlar®). However alternative materials with similar structural characteristics could also be used.

In a further aspect of the present invention there is provided a method of forming alloy based plugs in down-hole environments with restricted access, said method comprises: deploying one or more chemical heater units into a target region, wherein said heater units comprise a chemical heat source and a remotely operably ignition means enclosed within a protective coating or casing; deploying a eutectic/bismuth-based alloy shot into the target region so that it flows around said one or more heater units; and remotely activating the heater units so that they generate heat and melt the alloy shot.

BRIEF DESCRIPTION OF THE DRAWINGS

The various aspects of the present invention will be described with reference to the preferred embodiments shown in the drawings, wherein:

FIG. 8 shows a variant of the further aspect shown in FIG. 7.

DESCRIPTION OF THE PREFERRED EMBODIMENTS

Although eutectic/bismuth based alloys are referred to throughout the present disclosure it is appreciated that low melt alloys' or low melting point alloys' may also be used interchangeably with the eutectic/bismuth based alloys used in the tools of the present invention. The low melting point alloy group is defined in the technical field of die casting as those alloys that have a melting point of 385° C. or below.

The chemical heaters of the present invention can be employed in a range of down-hole operations, examples of which include: setting and removal of bridge plug, such as bismuth alloy based plugs; setting and removal of annular packers, such as thermally deformable annular packers; well barriers, downhole seals and liner hangers.

The level of control and focus that is achievable by the chemical heaters of the present invention means that it can be employed in down-hole, underground operations that previously may have been carried out using electrical heaters, which are more easily controlled from above ground.

The present invention relates to chemical heaters that preferably generate heat through a chemical reaction of thermite or a thermite based composition. As detailed in WO2014/096857, such compositions may comprise damping agents (such as sand) to configure the burn characteristics (e.g. temperature, burn speed) of the thermite to suit the requirements of a particular operation.

In use thermite, and indeed thermite based compositions, undergo an exothermic chemical reaction that generates a large amount of heat per unit of mass. By way of further explanation FIG. 1 shows a diagrammatic timeline of a thermite chemical reaction proceeding within a chemical heater known in the art.

Figure 1:
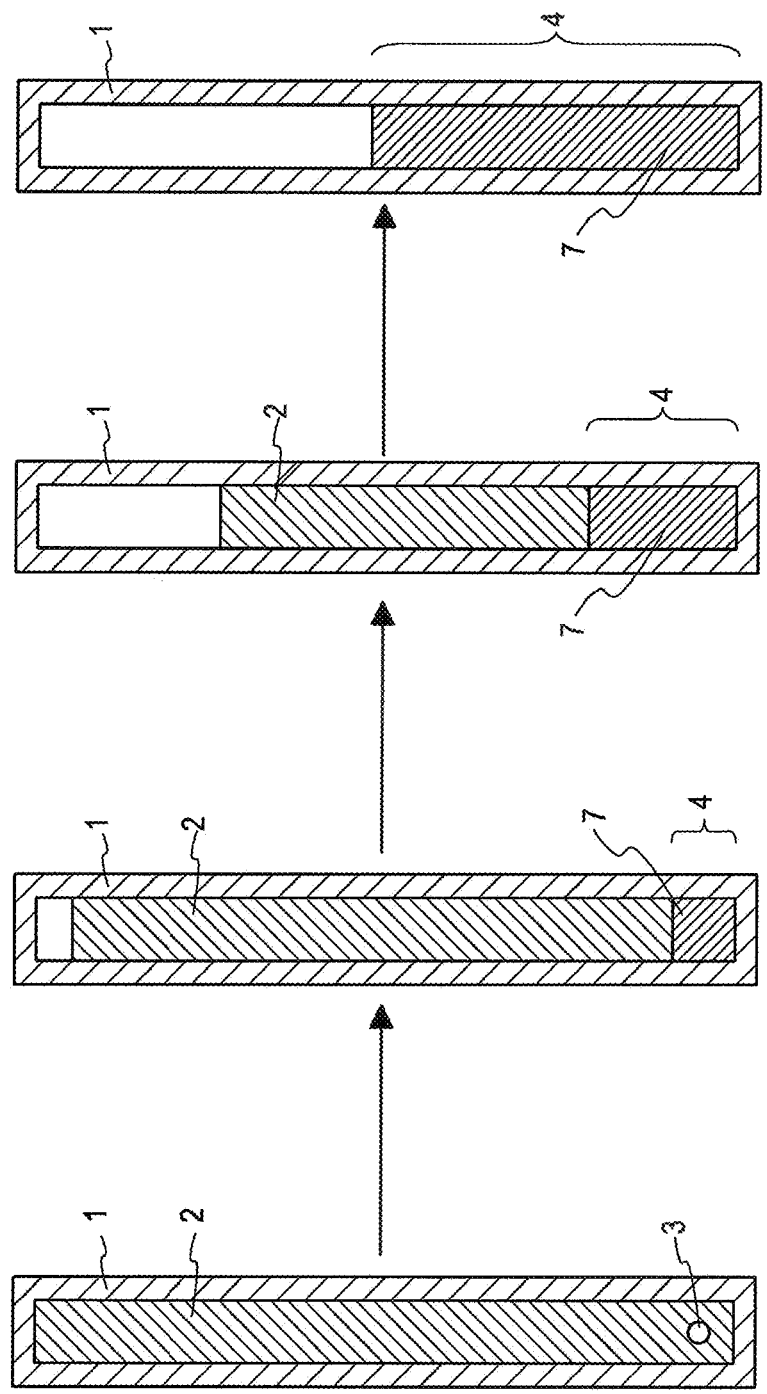
FIG. 1 shows a diagrammatic time line of an operating chemical heater typical in the prior art.

FIG. 1 shows a heater body 1 with an internal cavity. Within the cavity is received a chemical reaction heat source in the form of thermite 2. At the base of the heater body 1, which in use would typically be the leading end of the heater that is deployed down the hole first, is an ignition means 3.

The ignition means 3, which may be connected to a trigger (located above ground) by way of wiring that runs along the length of the heater and up the hole to the surface, is located within the cavity of the heater body and is surrounded with the thermite 2. In this way, triggering the ignition means from the surface initiates the chemical reaction in the thermite, which then spreads through the thermite located within the heater body. Alternatively the ignition means may be triggered remotely by use of a suitable wireless transmitter and receiver arrangement (i.e. receiver on the heater).

As the chemical reaction spreads heat energy is given off by the heater. Initially the heat given off is focused in the region of the ignition means 3 to form a heating zone 4. However as the chemical reaction spreads through the thermite 3 the heating zone 4 grows too. This ongoing reaction serves to grow the heating zone 4 until all of the thermite has been consumed.

Once the thermite has been consumed the chemical reaction will cease and the heat given off by the heater will decrease.

By retaining the thermite within a heater body it possible, to a certain extent, to control when the generated heat is deployed within a hole. However it will be appreciated from FIG. 1 that the nature of the chemical reaction is such there is an inevitable spreading of the heating zone over the duration of the chemical reaction. This may or may not be desirable, depending on the type of operation being carried out.

However for those situations where a particular operation requires a more controlled or focused heating zone the present invention provides a chemical heater which is capable of deploying such a heating zone.

Figure 2:
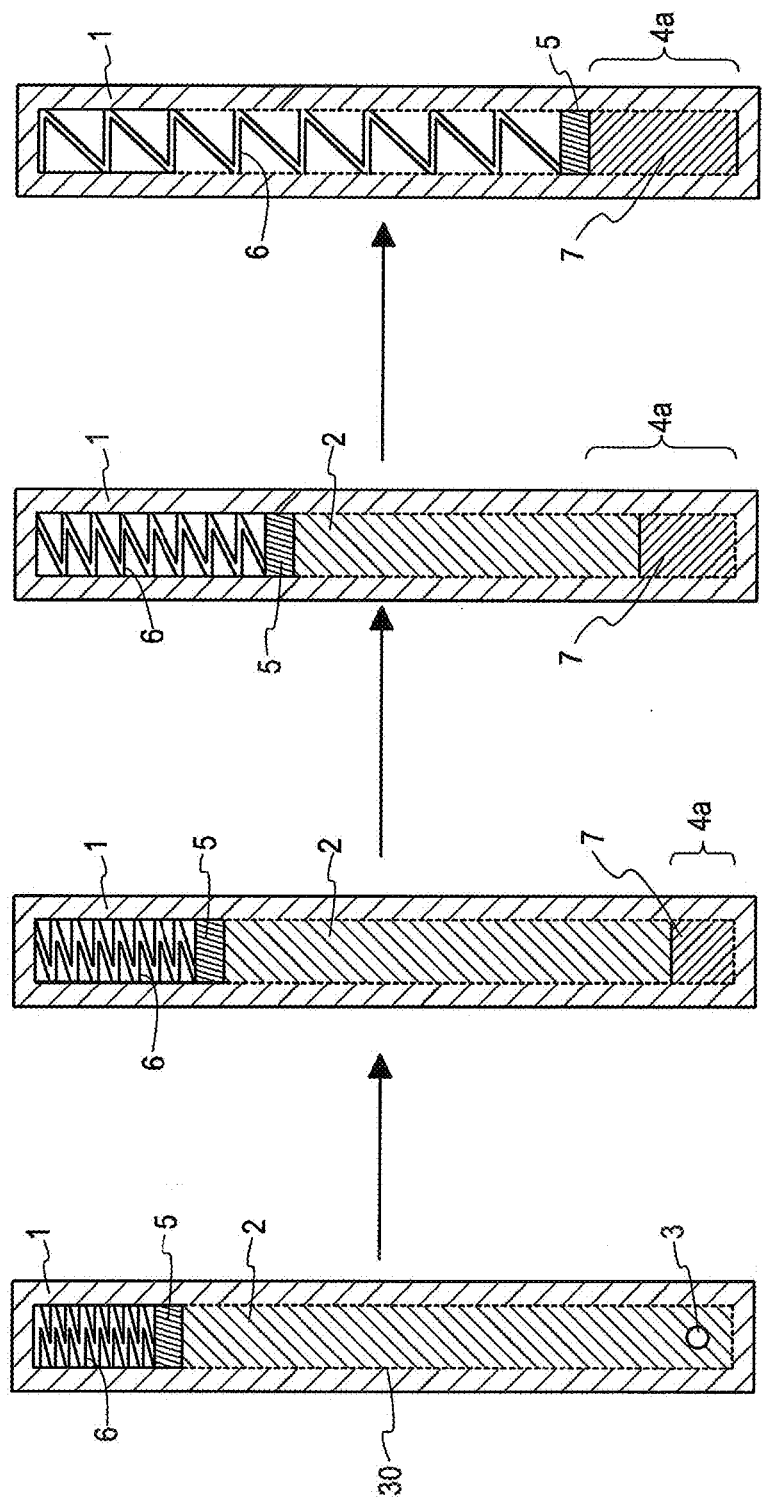
FIG. 2 shows a diagrammatic time line of a chemical heater of present invention in operation.

In this regard FIG. 2 shows a diagrammatic time line of a thermite chemical reaction proceeding within a chemical heater in accordance with the present invention. FIG. 2 shows the key elements of the chemical heater of the present invention in its broadest sense only so as to demonstrate principle by which the heater operates.

Once again the chemical heater has a heater body 1 with an internal cavity, the heater is typically formed from steel, although other suitable materials will be appreciated by the skilled person.

Preferably the inside walls of the heater body 1 are coated with a refractory lining 30, such as $ZrO_2$, so as to prevent the molten chemical heat source from sticking to the walls of the heater body and causing burn through. For the sake of clarity the lining 30 is represented as a dashed line on the first step of FIG. 2 only. For the avoidance of any doubt it should be pointed out that the coating is continuous and, although not shown, is present at all stages of the operation of the heater.

Alternative materials to steel are also appreciated and it is envisaged that the heater body may be formed from consumable materials such as aluminium or plastic, although any material capable of keeping the chemical heater fuel (e.g. thermite) dry until it has been ignited is considered appropriate.

By forming the heater body from a consumable (e.g. by melting or burning) material it is possible to improve the seal/plug created within the well casing because the heater body does not act as a block to the formation of the alloy across the entire expanse of the well casing.

The heater body cavity houses a quantity of chemical reaction heat source, preferably in the form of thermite 2 (powder form, block form or fragmented block form). At the base region or leading end of the heater is provided ignition means 3 to trigger the start of the chemical reaction within the heater body 1.

At the opposite end of the heater, which will hereinafter be referred to as the trailing end, is provided an actuator in the form of a piston 5 and a spring 6. The actuator is arranged within the cavity of the heater body 1 such that the spring 6 urges the piston 5 away from the trailing end and towards the leading end of the heater.

The head of piston 5 has similar cross-sectional shape to the cavity, albeit slightly smaller, so that the piston can freely slide up and down within the cavity. It will be appreciated from FIG. 2 that, whilst the piston 5 is urged towards the leading end of the heater by the spring 6, the passage of the piston 5 within the cavity in the direction of the leading end is obstructed by the thermite 2 compacted within the cavity of the heater body 1.

Prior to use, the heater and its contents remain in equilibrium because the thermite and the actuator push against the opposing ends of the heater body within which they are housed. However, once the chemical reaction of the thermite 2 has been triggered by the ignition means 3, this balance of forces changes.

As the thermite 2 reacts, thereby generating a heating zone 4 *a*, it becomes more fluid 7 which enables the spring 6 to urge the piston 5 and the unreacted thermite 2 towards the leading end of the heater.

It is appreciated that by urging the unreacted thermite 2 toward the heating zone 4 *a*, wherein the chemical reaction is taking place, the spread of the reaction and the heating zone towards the trailing end of the heater is reduced, thereby providing a more controlled and focused heat generation at the leading end of the heater.

The self-contained nature of the heater of the present invention enables operators to achieve a more consistent and repeatable heating pattern because the quantity and type of the chemical reaction heat source can be calculated and formulated off-site in a factory.

Another benefit provided by the chemical heater of the present invention, in addition to the creation of more controlled and focused heating zones, is the ability to create chemical heaters having a greatly reduced cross-sectional width/diameter without compromising the heat generation capabilities of the heater.

Typically, the amount of heat generated by a chemical heater is determined by the amount of the chemical reaction heat source (e.g. thermite) provided within the heater. Although it is appreciated that the level of heat generated by the chemical reaction heat source is controlled by the type used another key limiting factor is the quantity of material being reacted at any one time.

Thus it will be appreciated that reducing the cross-sectional width (or diameter in the case of a tubular heater body) effectively creates a 'bottle neck' which limits the amount of thermite, for example, that is available to join the chemical reaction. As a consequence, although the chemical reaction does spread throughout the entire stock of unreacted thermite (e.g. see FIG. 1), the chemical reaction and thus the heat generated is impaired to a certain extent because the intensity and location of the heat is not as focused.

However the chemical heater of the present invention addressing this problem by urging the unreacted thermite, for example, towards the chemical reaction thereby 'stoking' the reaction rather than letting it progress naturally up the length of the heater body. This, it is envisaged, achieves an increased and more focused heat output than might otherwise be achieved from a heater having a reduced cross-section.

In addition, and as described above, the provision of a refractory coating lining 30 the inner walls of the heater body 1 also facilitates a reduction of the heater's cross-section without increasing the risk of the heater body being burned through.

Two down-hole operations which capitalise on this feature will be described with reference to FIGS. 3 and 4.

Figure 3:
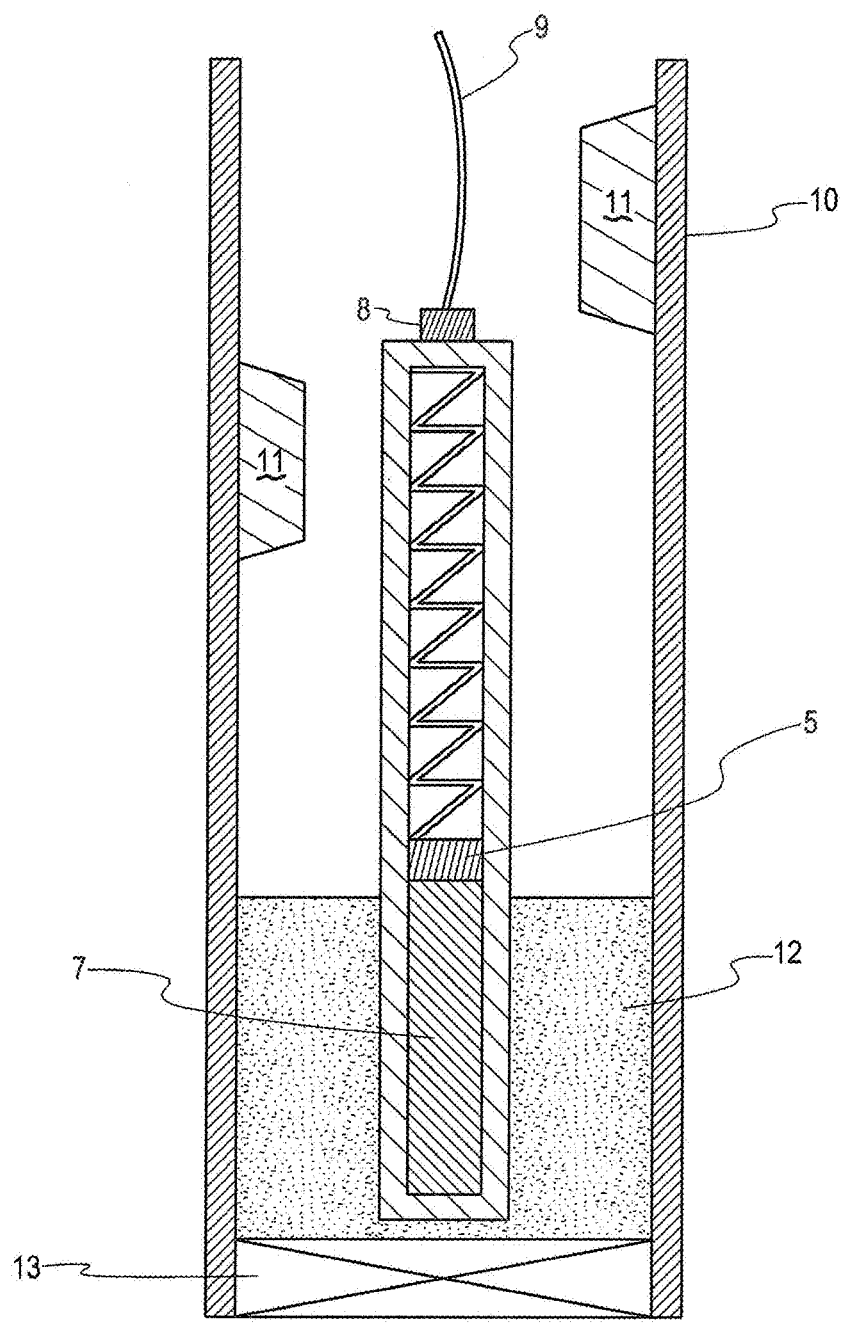
FIG. 3 shows a cross-sectional view of a chemical heater of the present invention being operated during the formation of a bismuth-alloy based plug.

FIG. 3 shows an operation to form a bismuth-alloy based plug within a hole using a chemical heater having a diameter that much smaller than that of the surrounding tubing/well casing 10. The surrounding tubing/well casing 10 has obstructions 11 projecting from its inner walls which reduce its diameter at locations along its length.

It is appreciated that the obstructions 11 would impede, or in some cases prevent, the deployment of chemical heaters that would normally be employed to in plug formation operations in tubing/well casings of the size shown in FIG. 3.

However, because the chemical heater of the present invention has the ability to feed unreacted material to the heating zone, and thereby 'stoke' the chemical reaction to produce a higher heat output than would otherwise be achieved if the reaction were allowed to progress naturally, the heater of the present invention can generate the necessary heat output required to melt the bismuth-based alloy and form the plug.

Advantageously, the alloy can be deployed in the form of an alloy shot 12, which can be poured into place within the target region. This can be done either before or after the heater has been deployed to the target region. It is appreciated that preferably the alloy may be delivered by the heater, with the alloy retained in-line with the heater body to maintain a streamline cross-section that aids deployment within obstructed wells.

The alloy 12 is shown in FIG. 3 as being supported by a platform 13. It is appreciated that this may be formed by a range of known permanent and semi-permanent devices or plugs. In this regard it is envisioned that the devices disclosed in WO 2014/096858 are considered applicable. Indeed the teachings of the inventor's earlier disclosure are considered compatible with the improved chemical heater of the present invention.

In use, the chemical heater is provided with deployment tool engagement means 8, to which a suitable wireline 9 can be secured, so that the heater can be delivered down a hole to the target region. In addition to holding the weight of the heater during the operation, it is appreciated that the wire line 9 can facilitate the transmission of an ignition signal from an above-ground trigger to the ignition means 3 (not shown) within the heater. However it is appreciated that a wireless trigger system might also be employed.

Once triggered, the chemical reaction of the thermite, for instance, will proceed as shown diagrammatically in FIG. 2 until it reaches the point shown in FIG. 3, at which time the alloy shot 12 has been melted.

Once the unreacted thermite has been used up in the chemical reaction the heater will gradually start to cool, thereby allowing the molten alloy to cool, expand and form a plug within the well casing 10.

Preferably, and in accordance with another aspect of the present invention, the heater may be at least partially retrieved (in so far as it is separated from the alloy) whilst it is still generating heat.

It is envisioned that by withdrawing the heater whilst it is still hot ensures that the alloy is still molten (i.e. fluid). This in turn enables the alloy to flow into the void created by the withdrawal of the heater. This approach enables the formation of a plug that extends across the entire cross-section of the well casing uninterrupted, which ensures a more reliable seal.

Figure 4:
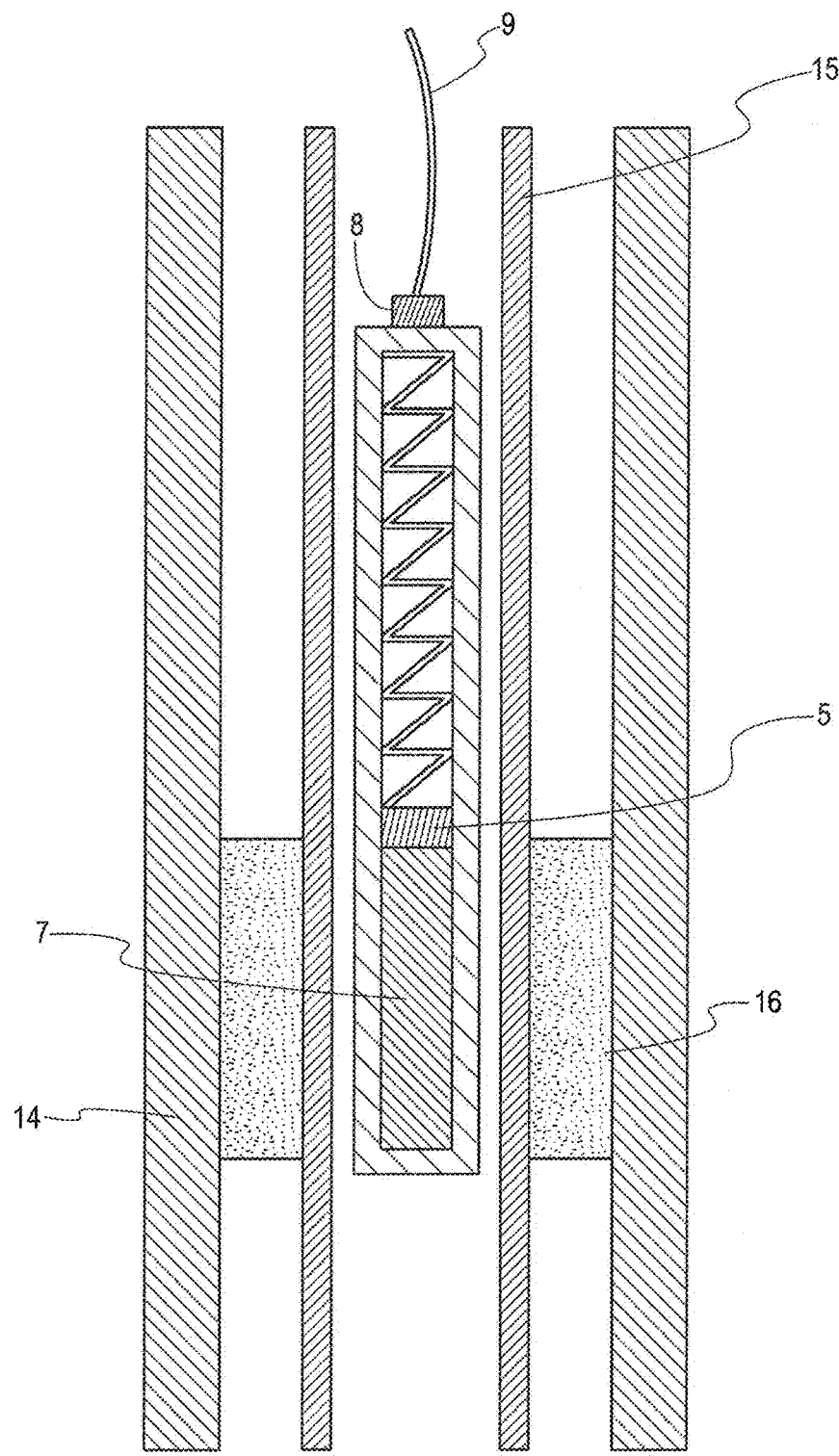
FIG. 4 shows a cross-sectional view of a chemical heater of the present invention being operated during the setting of a thermally deformable annular packer (TDAP)

FIG. 4 shows another downhole operation that can benefit from the provision of a chemical heater that can be reduced in cross-sectional width/diameter without greatly reducing its heating capabilities. In this regard, FIG. 4 shows an operation for activating an annular packer 16 located in the annular space between an inner tubing 15 and an outer well casing or bore-hole formation 14.

In this operation the inner tubing 15, within which the chemical heater is delivered to the region of the annular packer 16, has a limited cross-section. However in order to adequately melt the annular packer 16, which in the case of thermally deformable annular packers (TDAPs) is formed from a bismuth-based alloy, the heater must be capable to achieving high temperatures to achieve the required heating effect. Preferably the heater must be capable of achieving temperatures that are in the range of 100-300° C., and preferably about 200° C., above the downhole temperature.

Once again, the above detailed feature of feeding the unreacted chemical reaction heat source into the heating zone serves to 'stoke' the chemical reaction taking place within the heating zone thereby delivering the required heat to the target region (i.e. adjacent the annular packer 16).

As the heater and the alloy of the annular packer are not in direct contact it is less crucial that the heater is retrieved whilst it is still generating heat, unlike in the operation shown in FIG. 3.

A further improvement to chemical heaters will now be described with reference to FIGS. 5 and 6. Whilst the improvement will be described in combination with the zo actuator feature described above it is envisioned that the benefit provided by the improvement is such that it could be usefully employed in chemical heaters without internal actuators like those described herein. However, having said that, the use of the improvement in combination with the actuator feature is considered particularly beneficial.

Figure 5:
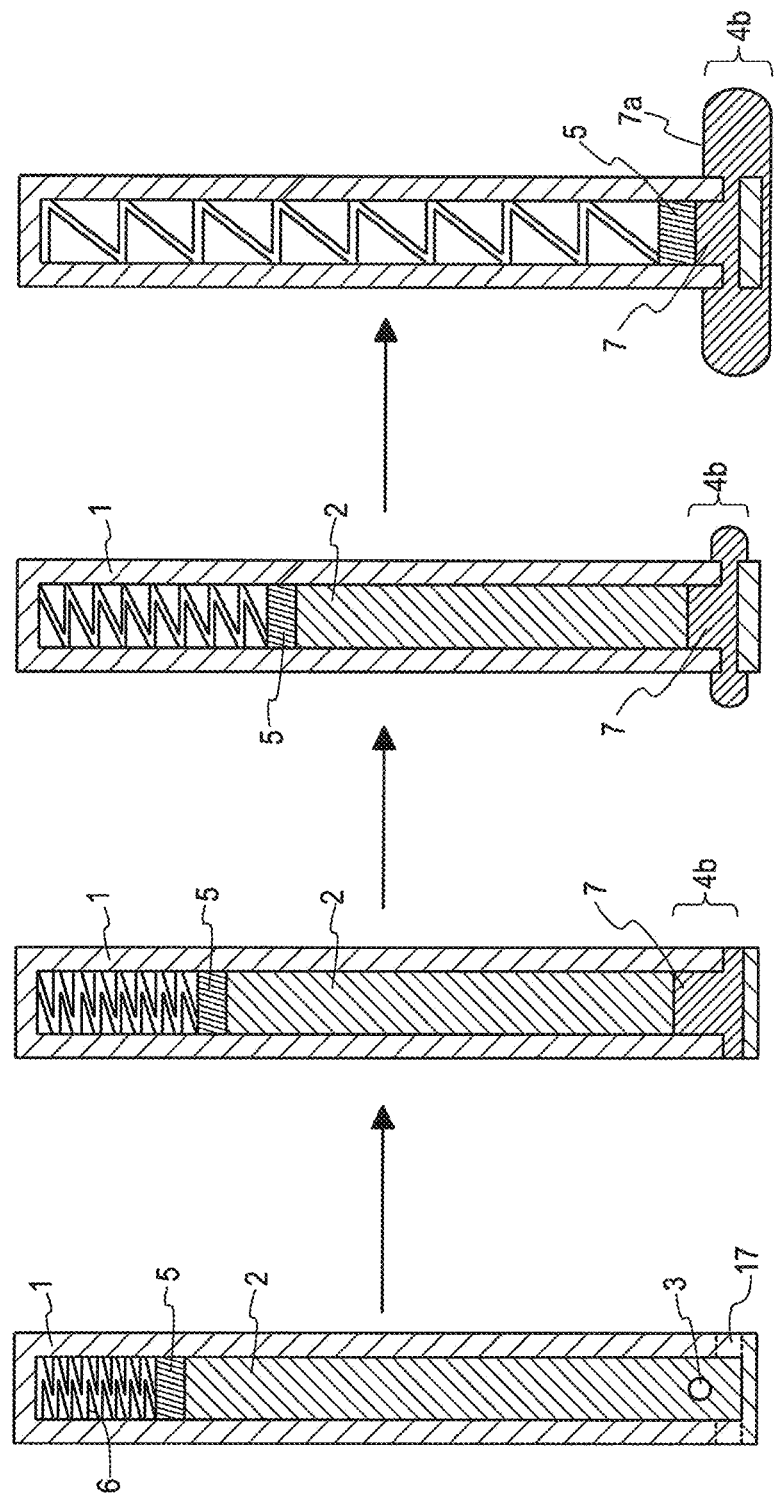
FIG. 5 shows a diagrammatic time line of an alternative embodiment of the chemical heater of the present invention in operation.

FIG. 5 shows a diagrammatic time line of the progress of a thermite chemical reaction within an alternative embodiment of the chemical heater of the present invention. Although a refractory lining (see FIG. 2) is not shown as being present on the inner walls of the heater body it will be appreciated that the provision of such a coating would provide the additional benefits discussed above.

The chemical heater shown in FIG. 5 is similar to that shown in FIG. 2, but with the addition of a weakened region 17 located in the heater body 1 at the leading end of the heater. The region 17 is weakened relative to the rest of the heater body 1 such that it is more susceptible to being melted by the thermite 2 when it reacts to form a molten fluid 7.

It is envisioned that the weakened region may be defined as a region of the heater body which is thinner that the rest of the body 1. However, alternative means for providing the weakened region are considered possible. For example the heater body 1 may be provided with one or more apertures, which are then plugged with a material that has a lower melting point that the rest of the heater body 1.

A further possibility is to configure the leading end (i.e. the heating zone) of the heater body to have a higher heat resistance that the rest of the heater body 1. The weakened region of the heater could then be provided by areas of the heating zone that do not have the higher heat resistance. As detailed above the heater body may be formed from steel, although alternative materials are envisioned. The region of the heater with a higher heat resistance may preferably be formed from carbon fibre, Kevlar™, fibre glass and more exotic steels/alloys.

In use the weakened regions 17 of the heater are breached first by the heat produced by the chemical reaction taking place within the cavity of the heater body 1. Once the weakened regions 17 have been breached the molten fluid 7 of the reacting thermite, for example, is able to leave the inner cavity of the heater body 1.

The escape of the molten fluid 7 is assisted by the pressure of the unreacted thermite, for example, being urged towards the leading end (and heating zone 4 b) by the piston 5 and the spring 6.

It will be appreciated from FIG. 5 that providing a means by which the molten fluid 7 of the reacting thermite can leave the heater body 1 enables the creation of an even more controlled and focused heating zone 4 b, at least with respect to the passage of heat up the length of the heater—see FIGS. 1 and 2 for contrast.

Rather than travelling up the heater body towards the trailing end thereof the chemical reacting thermite, and the heat it generates, is ejected from the heater body in a direction perpendicular to the central vertical axis of the heater (see 7 a).

Although not shown, it is envisaged that one or more additional weakened regions may be provided closer to the trailing end of the heater body. As described above, locating the weakened regions further up the heater body allows for the formation of inlets that allow the external down-hole environment to communicate with the internal space that is created by the consumption of the chemical reaction heat source (e.g. thermite) as it is consumed.

In this way the internal pressure of the heater body can be allowed to equalise with the external pressure by allowing the external fluids to flood into the part of inter cavity of the heater body that was originally filed by thermite, for example. As detailed above, this equalisation helps to prevent the heater body being deformed by the external forced imparted on it by the down-hole environment.

Figure 6:
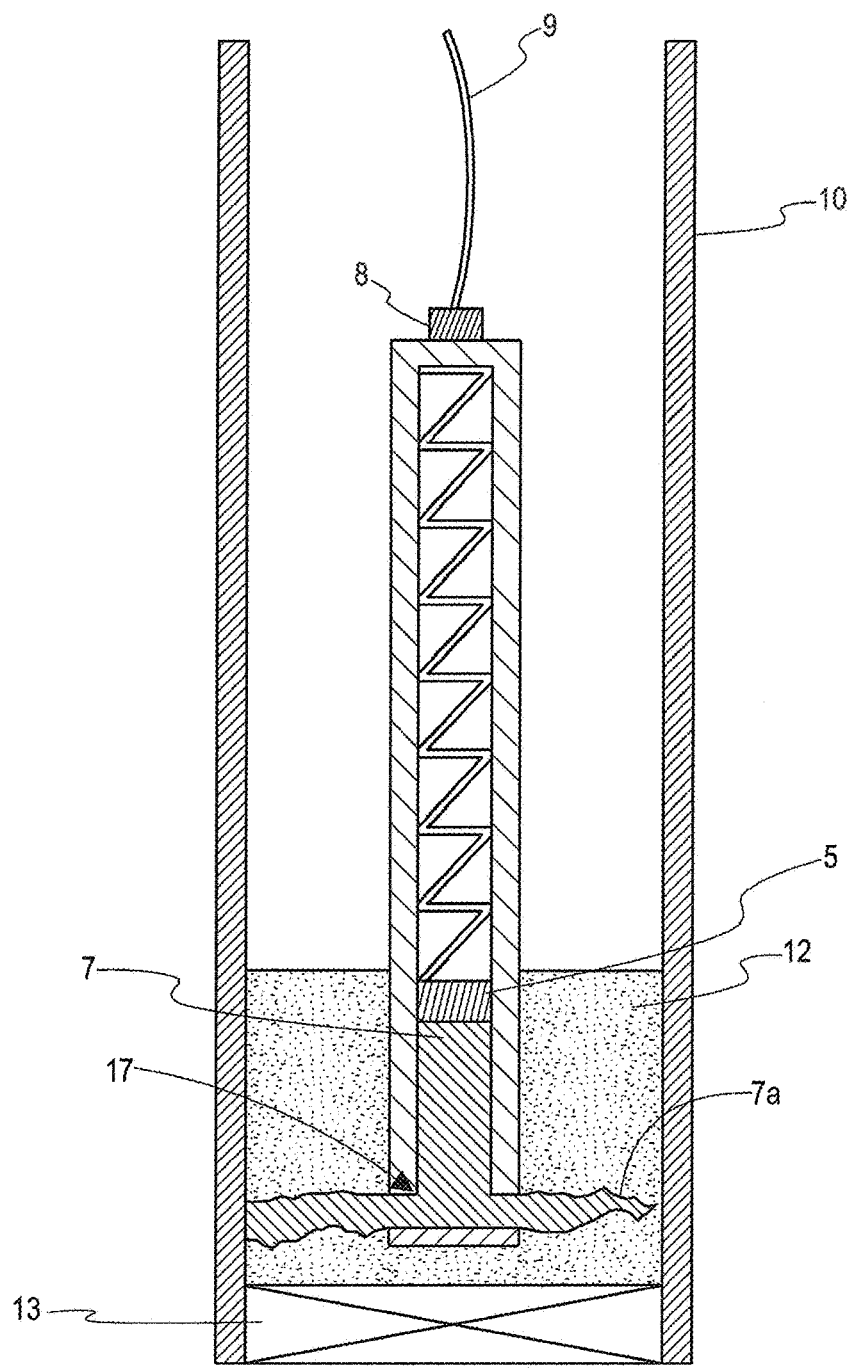
FIG. 6 shows a cross-sectional view of the chemical heater shown in FIG. 5 being operated during the formation of a bismuth-alloy based plug.

FIG. 6 shows the chemical heater of FIG. 5 in practical use in an operation to set a eutectic/bismuth alloy based plug 12 within a tubing/well casing 10. It is appreciated that the ejected molten fluid of the reacting thermite 7 a, or the like, mixes with the alloy thereby providing an enhanced heating effect.

Other than the provision of the weakened regions 17 in the heater body the arrangement shown in FIG. 6 has essentially the same features as are shown in FIG. 3. The details provided in relation to FIG. 3 therefore apply to the arrangement shown in FIG. 6. In addition, it is envisioned that in arrangements where a refractory lining is provided on the inner walls of the heater body, the weakened region may be left uncoated with the refractory material (e.g. $ZrO_2$).

Although not shown in FIG. 6 is envisaged that if thermite were provided in sufficient quantities the molten fluid of reacting thermite 7 a could be urged outwards towards the tubing/well casing where it could, if provided at a sufficient temperature, melt through the tubing/well casing too. In this way the plug could be further anchored in place within the tubing/well casing 10.

Again, if sufficient thermite were provided within the heater body 1, it is envisioned that the chemical heater of the present invention could be used to form a plug without the need for the eutectic/bismuth alloy. Instead, the molten fluid of reacting thermite could be urged outwards from the heater such that it melts through the surrounding tubing/well casing, so that, once it is allowed to cool, the solidified reacted thermite would, in combination with the melted casing, form a plug.

Although the above identified embodiments of the chemical heater of the present invention all employ a spring actuated piston to urge the unreacted chemical reaction source material towards the leading end (i.e. the heating zone) of the heater, it is envisioned that any actuator capable of applying a pushing force to the unreacted thermite independent of force of gravity could usefully be employed in the invention.

The provision of an actuator that operates independently of gravity is important because it enables the chemical heater of the present invention to be utilised in operation within both vertical holes and also those holes that at least have sections that are substantially non-vertical in orientation.

To this end, it is envisaged that suitable variants of actuators for use in the present invention include pistons that are mechanically, hydraulically and/or pneumatically driven towards the leading end of the heater.

In order to ensure the effectiveness of the claimed invention the piston is preferably configured to have a high heat resistance so as to ensure the integrity of the actuator at all times during the progress of the chemical reaction.

Figure 7:
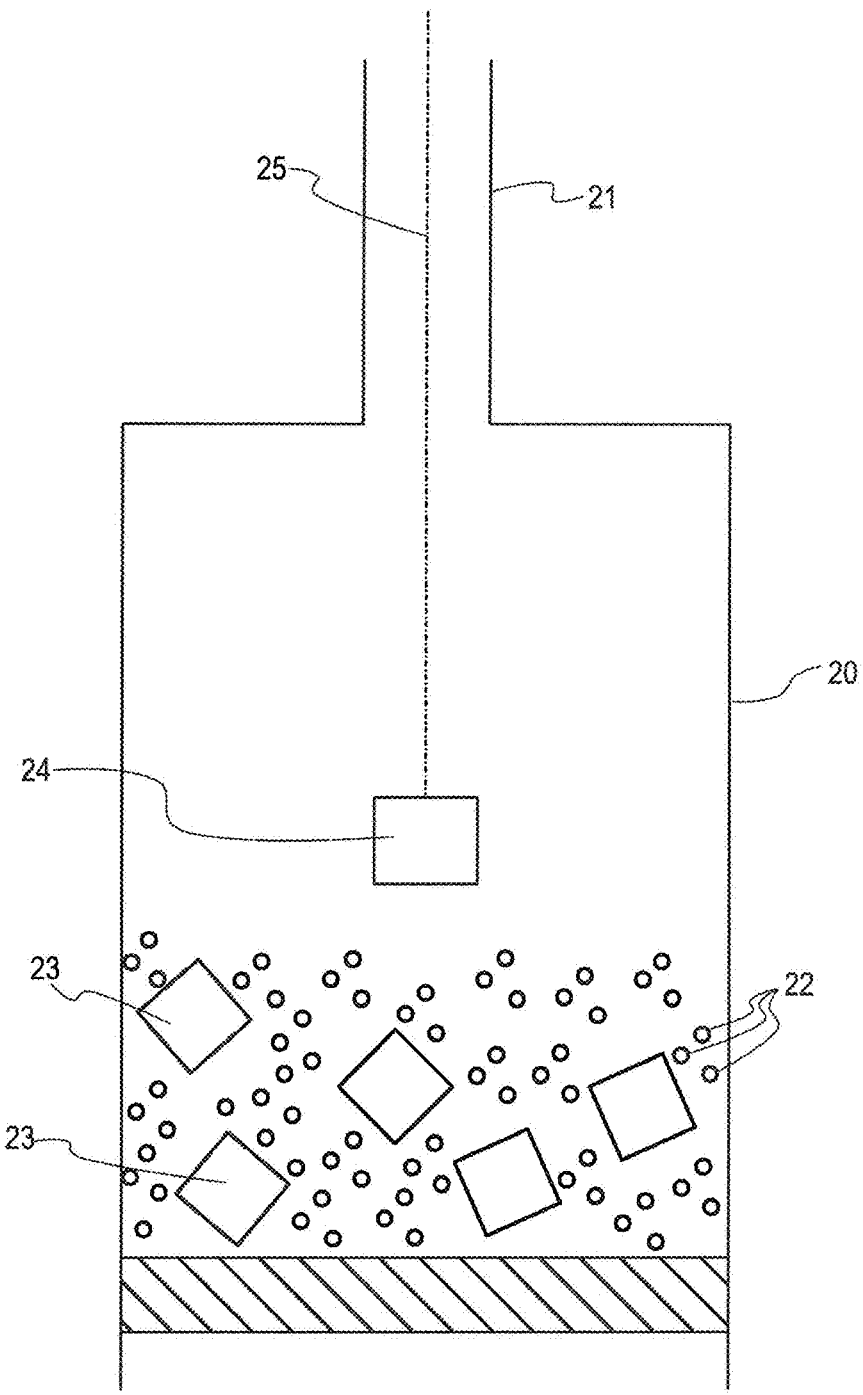
FIG. 7 shows an further aspect of the present invention.

A further aspect of the present invention is demonstrated by way of the examples shown in FIGS. 7 and 8. This aspect is considered particularly effective for setting well barriers and plugs within downhole environments with restricted access where there are limits to the size of the heater and plug.

FIG. 7 shows a diagrammatic view of a well casing/tubing 20 with a restricted region 21, which might be formed by a partial blockage or a disposed tool for example. As a result of the restricted region 21 the deployment of heater and plug assembly with the required quantities of chemical heat source (e.g. thermite) and alloy is made much more difficult.

Due to the restricted access it is envisaged that rather than deploying a heater on a wire line, possibly with an associated plug body, one or more chemical heater units 23 can be deployed to the target region (i.e. where the well barrier is to be formed).

Each heater unit 23 is a self-contained item comprising a chemical heat source and a remotely operable ignition means encapsulated in a protective coating or case. Preferably the protective coating or case is formed from a material that will be consumed when the chemical reaction of the chemical heat source starts to generate heat.

Although the units 23 are shown as blocks it will be appreciated that a range of configurations would be suitable provided they can pass the restriction region 21 in the well casing.

A plurality of pellets or shot 22 of a suitable alloy (such as a bismuth based alloy) is also deployed into the target region at the same time as the one or more heater units 23 so as to create a mixture of the two components. It is envisaged that the total number of heater units 23 required will depend on the amount of alloy shot 22 that is to be melted, which in turn will depend on the size of the well barrier required.

Once the alloy 22 and the heater units 23 have been deployed into the target region a radio transmitter 24 can be used to trigger the ignition means of the heater units either simultaneously or separately. Although the radio transmitter might be operated from above ground, preferably the radio transmitter 24 can be deployed down the hole so that it is closer to the vicinity of the heater units. This enables the technical specifications of the wireless technology to be much simpler.

In an alternative arrangement shown in FIG. 8 the deployment of a chemical heat source through a restricted region 21 is achieved by forming the chemical heater into a flexible elongate shape 26. It is envisioned that this can be achieved by filing an elongate bag or 'sock' with a powdered chemical heat source.

Preferably the bag/sock may be formed from Kevlar™, although it is appreciated that suitable alternative materials can be used provided they have the required strength and flexibility. As with the heater units shown in FIG. 7, the heater bag/sock will also preferably be provided with remotely operable ignitors or other typical down-hole ignition means 27.

FIG. 8 shows a three step process by which the heater 'sock' is deployed down a hole with restricted access due to a restricted region 21.

Initially a first sock 26 is deployed into the target region and allowed pile up to essentially form a heating base. Once in place suitable alloy shot or pellets can be delivered down the well on top of the heating base formed by the sock 26.

Following the delivery of the alloy shot 22 and further heater sock 26 can be deployed on top of the alloy and the first sock. Once in place a radio transmitter (not shown) can be used to trigger the heaters and melt the alloy.

It is envisioned that preferably the base heater would be triggered first to start off the melting of the alloy. After a short period of time (e.g. 2-5 mins) the second top heater sock can be triggered. In this way any un-melted alloy, which tends to float to the top of the molten alloy, can be subjected to further heat from above and thus be melted.

Once again, preferably the heater sock is made from a material that will be consumed by the heat generated by the chemical heat source. In this way the barrier formed by the cooling alloy is not impaired by a heater body.

What is claimed is:

1. A method of forming alloy based plugs in downhole environments with restricted access, said method comprising:
   deploying one or more chemical heater units into a target region within a downhole environment, wherein each heater unit comprises a chemical heat source and a remotely operable ignitor enclosed within a flexible elongate shape;
   deploying a bismuth-based alloy shot into the target region so that it flows around said one or more heater units; and
   remotely activating the heater units so that they generate heat and melt the alloy shot.

2. The method as defined in claim 1 wherein said one or more chemical heater units comprise thermite as the chemical heat source.

3. The method as defined in claim 1 or 2 wherein the chemical heater units are remotely activated using a radio transmitter either simultaneously or separately.

4. The method as defined in claim 3 further comprising the step of deploying the radio transmitter downhole.

5. The method of any one of claims 1-2 further comprising consuming the flexible elongate shape by the chemical heat source.

6. The method of any one of claims 1-2 wherein the chemical heat source is provided in a powered form or fragmented block form.

7. The method of any one of claims 1-2 wherein the flexible elongate shape is formed from a strong and flexible material.

8. The method of any one of claims 1-2 wherein the method comprises the steps of: deploying a first chemical heater unit into the target region and allowing it to pile up to form a heating base; delivering the bismuth-based alloy shot into the target region so that it is placed on top of the heating base formed by the first chemical heater unit; deploying a second chemical heater unit into the target region so that it is placed on top of the alloy and the first chemical heater unit; and using a radio transmitter to trigger the heater units and melt the alloy.

9. The method as defined in claim 1 or 2 wherein the first chemical heater unit is triggered first and then, after a short period of time, the second chemical heater unit is triggered.

10. A flexible chemical heater configured for use in downhole environments with restricted access comprising a chemical heat source and a remotely operable ignitor to initiate a chemical heat reaction, wherein the said chemical heat source and the remotely operable ignitor are enclosed within a flexible elongate shape.

11. The flexible chemical heater as defined in claim 10 wherein the chemical reaction heat source is provided in powered form or fragmented form.

12. The flexible chemical heater as defined in claim 10 or 11 wherein the flexible elongate shape is formed from a strong and flexible material.

13. The flexible chemical heater as defined in claim 10 or 11 wherein the chemical reaction heat source is thermite or a thermite based composition.

* * * * *